(12) United States Patent
Mestha et al.

(10) Patent No.: US 7,295,340 B2
(45) Date of Patent: Nov. 13, 2007

(54) SYSTEMS AND METHODS FOR OBTAINING A SPATIAL COLOR PROFILE, AND CALIBRATING A MARKING SYSTEM

(75) Inventors: Lalit K. Mestha, Fairport, NY (US); Steve Bolte, Rochester, NY (US); Eli Saber, Webster, NY (US); Shawn Updegraff, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 1018 days.

(21) Appl. No.: 10/248,387

(22) Filed: Jan. 15, 2003

(65) Prior Publication Data

US 2004/0136013 A1 Jul. 15, 2004

(51) Int. Cl.
*H04N 1/50* (2006.01)

(52) U.S. Cl. .................. 358/1.9; 358/1.9; 358/504; 356/419; 356/420; 356/425; 250/226; 347/232

(58) Field of Classification Search .................. 358/1.9, 358/504; 399/499; 356/419, 420, 425; 250/353, 250/226; 347/232
See application file for complete search history.

(56) References Cited

U.S. PATENT DOCUMENTS

| | | | |
|---|---|---|---|
| 4,959,669 A | 9/1990 | Haneda et al. | |
| 5,200,816 A | 4/1993 | Rose | |
| 5,339,176 A | 8/1994 | Smilansky et al. | |
| 5,357,448 A | 10/1994 | Stanford | |
| 5,612,902 A | 3/1997 | Stokes | |
| 5,771,311 A | 6/1998 | Arai | |
| 5,809,213 A | 9/1998 | Bhattacharjya | |
| 5,950,040 A | 9/1999 | Mestha et al. | |
| 6,005,970 A | 12/1999 | Ohneda et al. | |
| 6,052,195 A | 4/2000 | Mestha et al. | |
| 6,081,353 A | 6/2000 | Tanaka et al. | |
| 6,157,469 A | 12/2000 | Mestha | |
| 6,172,681 B1 | 1/2001 | Ueda | |
| 6,185,385 B1 | 2/2001 | Mestha et al. | |
| 6,188,786 B1 | 2/2001 | Ueda et al. | |

(Continued)

FOREIGN PATENT DOCUMENTS

EP 0491131 A2 6/1992

(Continued)

OTHER PUBLICATIONS

U.S. Appl. No. 09/487,587, filed Jan. 19, 2000, Yao Wang et al.

(Continued)

*Primary Examiner*—King Y. Poon
*Assistant Examiner*—Ashish K. Thomas
(74) *Attorney, Agent, or Firm*—Oliff & Berridge, PLC

(57) ABSTRACT

Tone reproduction curves for calibrating a marking system are obtained using a test pattern with a plurality of patches, preferably a plurality of first test patches extending in a first direction and at least one second test patch extending in a second direction crossing the first direction. Reflectance values are obtained from the first and second test patches. A set of gray balanced tone reproduction curves are obtained based on the reflectance values of the first test patches, and a set of spatial gray balanced tone reproduction curves are obtained based on the reflectance values of the second test patches.

29 Claims, 11 Drawing Sheets

U.S. PATENT DOCUMENTS

| | | |
|---|---|---|
| 6,215,561 B1 | 4/2001 | Kakutani |
| 6,236,474 B1 | 5/2001 | Mestha et al. |
| 6,292,195 B1 | 9/2001 | Shimizu et al. |
| 6,323,969 B1 | 11/2001 | Shimizu et al. |
| 6,344,902 B1 | 2/2002 | Duke et al. |
| 6,538,770 B1 * | 3/2003 | Mestha .................. 358/1.9 |
| 6,556,300 B2 * | 4/2003 | Tandon et al. .............. 356/419 |
| 2003/0147660 A1 * | 8/2003 | Shim et al. .................. 399/49 |

FOREIGN PATENT DOCUMENTS

| | | |
|---|---|---|
| EP | 0582997 A1 | 2/1994 |
| EP | 0625847 A1 | 11/1994 |
| EP | 0811829 A2 | 12/1997 |
| EP | 0868074 A1 | 9/1998 |
| EP | 0915615 A2 | 5/1999 |
| WO | WO 97/34409 A2 | 9/1997 |

OTHER PUBLICATIONS

U.S. Appl. No. 09/221,996, filed Dec. 29, 1998, Lingappa K. Mestha et al.

U.S. Appl. No. 09/487,586, Lingappa K. Mestha et al.

U.S. Appl. No. 09/461,042, filed Dec. 15, 1999, Lingappa K. Mestha et al.

U.S. Appl. No. 09/566,291.

Bens, R.S.: "Spectral modeling of a Dye Diffusion Thermal Transfer Printer", *Journal of Electronic Imaging*, vol. 2, No. 4, Oct. 1993, pp. 359-370.

U.S. Appl. No. 09/566,291, filed May 5, 2000, Mestha et al.

\* cited by examiner

SYSTEMS AND METHODS FOR OBTAINING A SPATIAL COLOR PROFILE, AND CALIBRATING A MARKING SYSTEM

CROSS REFERENCE TO RELATED APPLICATIONS

The following U.S. patent applications are hereby incorporated herein by reference in their entirety; U.S. application Ser. No. 09/566,291, entitled ON-LINE CALIBRATION SYSTEM FOR A DYNAMICALLY VARYING COLOR MARKING DEVICE; U.S. application Ser. No. 09/941,774, entitled SYSTEMS AND METHODS FOR DETERMINING SPECTRA USING DYNAMIC KARHUNEN-LOEVE ALGORITHMS WITH MEASUREMENTS FROM LED COLOR SENSOR; and U.S. application Ser. No. 09/941,858, entitled SYSTEMS AND METHODS FOR DETERMINING SPECTRA USING DYNAMIC LEAST SQUARES ALGORITHMS WITH MEASUREMENTS FROM LED COLOR SENSOR.

BACKGROUND OF THE INVENTION

1. Field of Invention

This invention relates to systems and methods for obtaining a spatial color profile.

2. Description of Related Art

In conventional marking devices, quality defects appear in a marked image due to various factors. For example, changes in the optical density introduced by differences in laser/LED bar intensities, subsystem non-uniformities, donor roll reload, and the like can lead to image quality defects. Additionally, spatial non-uniformity errors, e.g., a situation in which pixels in one part of an image that have been defined as a certain color appear different from pixels in another part of the image that have been defined as the same color, are also present. Wire history, wire contamination, charging subsystem variations and photoreceptor variations are among the root causes for spatial non-uniformity errors in images.

Spatial non-uniformity errors can be addressed by modifying hardware or hardware operations. For example, in LED bars, exposure variations can be minimized by measuring the output of the LED elements and adjusting their duty cycle and/or intensity to ensure that all the elements have the same output. In laser exposure systems, similar duty cycle adjustments can be performed to minimize the exposure-related non-uniformities. Furthermore, routine cleaning of wires to remove contamination helps to reduce wire history-related non-uniformities.

Another known problem is the slow change in non-uniformity caused by subsystem drift and wire history effects. An example is shown in FIG. 1 for lightness measurements (L*) of a black patch uniformly developed along the process fast scan direction (x-direction) for a period of seven days. The non-uniformity curves, also known as "smiles" (or "frowns" when inverted), are labeled 11-17, respectively for the respective days. Thus, FIG. 1 shows that not only is there non-uniformity in the lightness across the fast scan direction, but this non-uniformity as a whole changes from day to day.

SUMMARY OF THE INVENTION

Modifying hardware or hardware operations results in added downtime, which often translates into lost revenues. Moreover, since image quality defects of various types often occur together (e.g., banding, streaking, mottle, macro and micro non-uniformity, etc.), it is often the case that by optimizing the system to address one type of defect usually results in amplifying one or more of the other types of defects.

It is useful to address non-uniformity problems in software. This invention enables building spatial gray balanced functions known as Tone Reproduction Curves (TRCs) using reflectance measurements from a limited set of mixed color test patches. For example, spatial gray balanced TRCs can be generated accurately using about 20 mixed CMY gray patches and about 20 K patches. These TRCs enable coarse non-uniformity correction thereby overcoming low frequency structures of the type shown in FIG. 1 above.

"Spatial" gray balanced TRCs are defined as a collection of gray balanced TRCs which are position dependent. In other words, during processing of an image, separate positions, e.g., pixels, of the image are each run through a spatial TRC that has been especially designed for that position.

In embodiments, the invention obtains TRCs for calibrating a marking system by obtaining a plurality of reflectance values from a plurality of first test patches of marking medium marked by the marking system and aligned in a first direction, the first direction being a direction of least non-uniformity; obtaining a plurality of reflectance values from at least one second test patch of marking medium aligned in a second direction that crosses the first direction, the second direction being a direction of greatest non-uniformity; obtaining a set of gray balanced TRCs based on the reflectance values of the first test patches; and obtaining a set of spatial gray TRCs based on the reflectance values of the second test patches.

In embodiments, the invention obtains a spatial color profile that may be useful for, for example, obtaining consistent and pleasing color in printing applications, improving product performance in coil coating, achieving accurate surface painting applications, and so forth.

These and other objects, advantages and salient features of the invention are described in or apparent from the following detailed description of exemplary embodiments.

BRIEF DESCRIPTION OF THE DRAWINGS

Exemplary embodiments of the invention will be described with reference to the drawings, wherein like numerals represent like parts, and wherein.

DETAILED DESCRIPTION OF PREFERRED EMBODIMENTS

This invention allows a spatial color profile, e.g., a spatial gray balanced tone reproduction curve, to be obtained efficiently using a set of reflectance values obtained from at least one mixed color patch.

Figure 1:
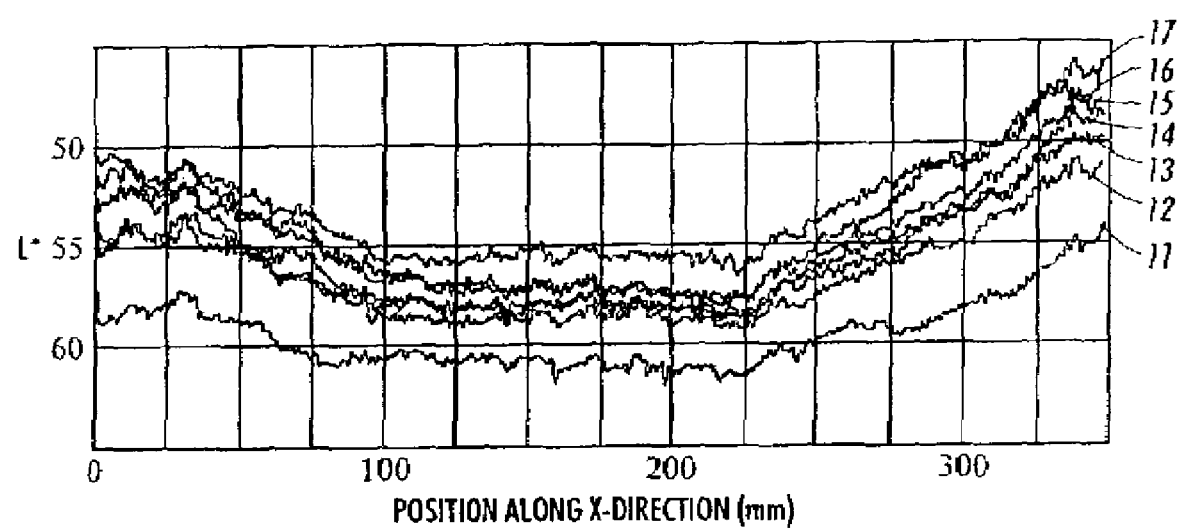
FIG. 1 is a graph illustrating non-uniformity problems in a conventional marking system.
Figure 2:
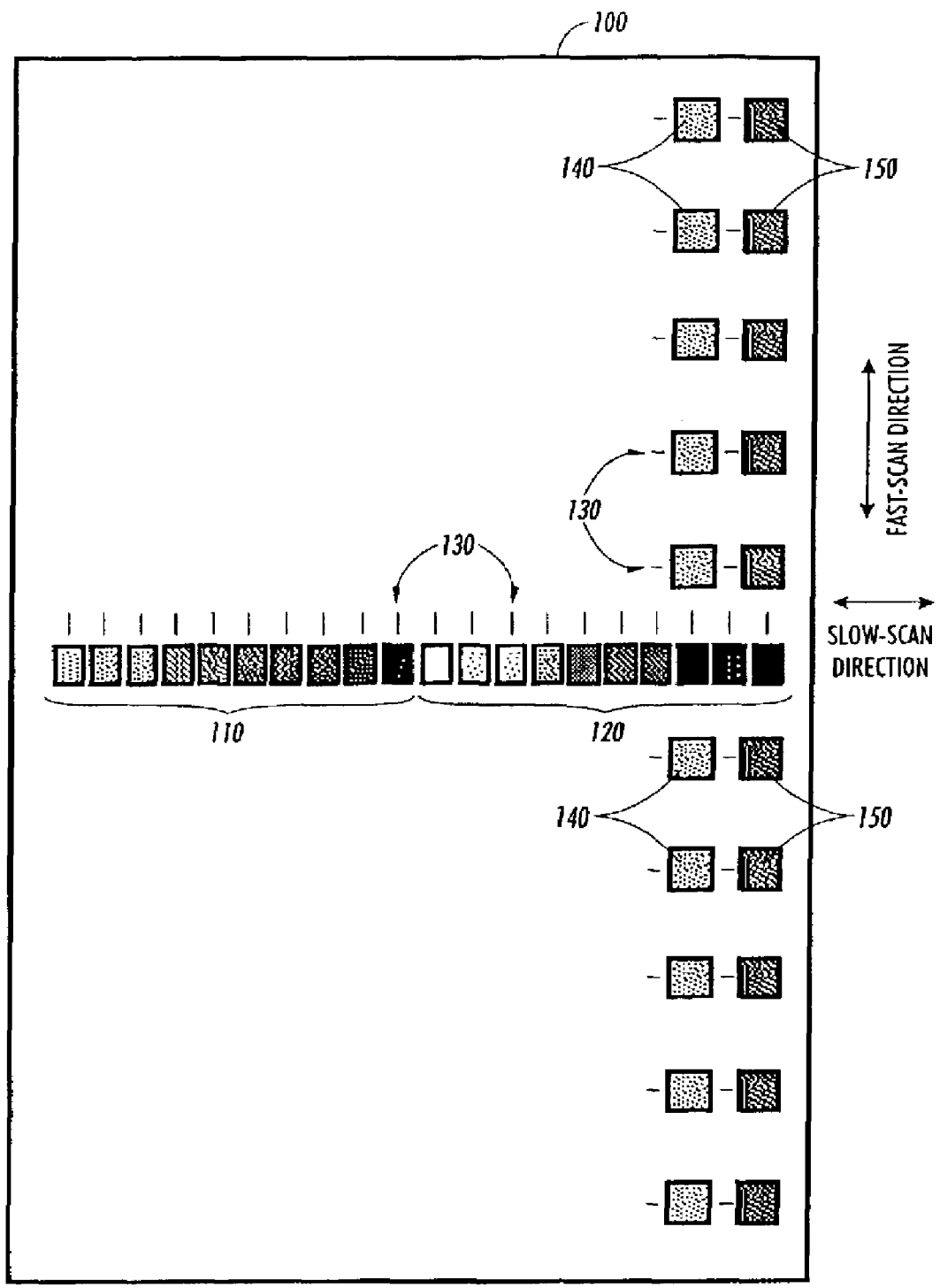
FIG. 2 illustrates an exemplary test patch pattern used for calibrating a marking system according to this invention.

FIG. 2 illustrates an exemplary test patch pattern 100 used for calibrating a marking system that marks using cyan (C), magenta (M), yellow (Y) and black (K) marking media, such as ink, toner or the like. The test pattern 100 includes a set of CMY gray patches 110, i.e., patches in which cyan, magenta and yellow marking media have been combined to make gray, and a set of K gray patches 120, i.e., patches in which black marking media has been applied at a certain area coverage to yield a "gray" patch. The CMY gray patches 110 vary from 0-100% coverage, as do the K gray patches 120. The CMY gray patches 110 and the K gray patches 120 extend in the slow-scan direction of the marking system to be calibrated, e.g., the direction of paper feed.

A fiducial mark 130 may located adjacent each patch 110 and 120. As described in more detail below, the fiducial marks 130 are detected by a fiducial mark sensor to trigger measuring of the reflectance of adjacent patch 110 or 120 by a reflectance sensor. The fiducial marks 130 may not be necessary if another method is employed to trigger measurement of the reflectance of each patch at the appropriate time as the patches pass under the reflectance sensor.

The test pattern 100 also includes a row of K gray patches 140 extending in the fast-scan direction, and a row of CMY gray patches 150 extending alongside the K gray patches 140. It will be appreciated that this invention is more applicable to a page-width marking system than to a moveable print-head-type marking system. The "slow-scan direction" is the direction of paper feed in the marking system, and the "fast-scan direction" is the direction substantially perpendicular to the slow-scan direction. The row of patches 140 and the row of patches 150 should extend substantially the entire length of the fast-scan direction of the marking system 200, assuming that non-uniformity is potentially a problem over the entire length. However, if non-uniformity is known to be a potential problem only over a portion of the fast-scan direction of the marking system 200, then the patches 140 and 150 may extend a shorter length, such as 75% or 50% of the fast-scan direction depending on the length of potential non-uniformity.

The CMY gray patches 150 extending alongside the K gray patches 140 give spatial non-uniformity information for patches with input digital values determined in advance using reference spatial sensitivity studies. The K gray patches 140 and CMY gray patches 150 are each the same color, e.g., 50% gray or any other value between 0 and 100%, depending on what value was used for the reference studies. In this example, a total of 40 test patches are used. However, more or fewer patches may be used, as appropriate, based on the desired resolution and bandwidth requirement for page non-uniformity. Like the patches 110 and 120, each patch 140 and 150 has a fiducial mark 130 adjacent thereto. The patches 140 and 150 can be positioned on the page at most-sensitive locations spread on the page. These locations can be determined through off-line studies according to known methods.

Furthermore, as described in more detail below in connection with FIG. 7, the sets of patches 140 and 150 may each be replaced by a single strip of marking medium, from which a plurality of reflectance values are obtained.

Figure 3:
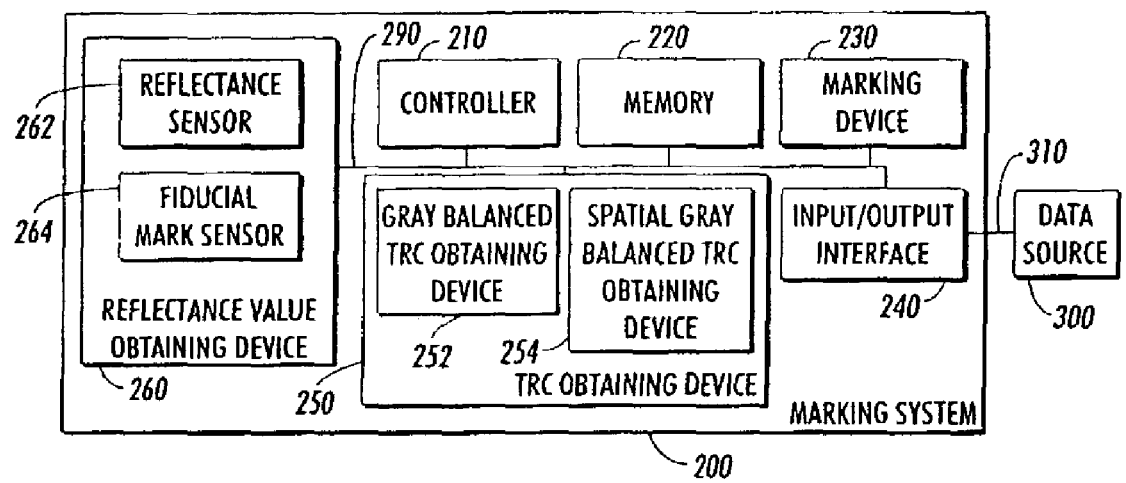
FIG. 3 is a functional block diagram illustrating an exemplary embodiment of a marking system according to this invention.

FIG. 3 is a functional block diagram illustrating an exemplary embodiment of a marking system 200 according to this invention. The marking system 200 is connected to a data source 300 via a link 310. Those skilled in the art will appreciate from the following description that various elements and functions of the marking system 200 are capable of implementing the elements and functions described in U.S. patent application Ser. No. 09/566,291. As such, this invention may be viewed, in one aspect, as an extension of the invention described in U.S. patent application Ser. No. 09/566,291, able to perform additional functions.

The data source 300 can be a digital camera, a scanner, or a locally or remotely located computer, or any other known or later developed device that is capable of generating electronic image or text data. Similarly, the data source 300 can be any suitable device that stores and/or transmits electronic data, such as a client or a server of a network. The data source 300 can be connected to the marking system 200 over a connection device, such as a modem, a local area network, a wide area network, an intranet, the Internet, any other distributed processing network, or any other known or later developed connection device.

It should also be appreciated that, while the electronic data can be generated at the time of printing an image or text from an original physical document, the electronic data could have been generated at any time in the past. Moreover, the electronic data need not have been generated from the original physical document, but could have been created from scratch electronically. The data source 300 is thus any known or later developed device which is capable of supplying electronic data over the link 310 to the marking system 200. The link 310 can thus be any known or later developed system or device for transmitting the electronic image data from the image data source 300 to the marking system 200.

Further, it should be appreciated that the link 310 can be a wired, wireless or optical link to a network (not shown). The network can be a local area network, a wide area network, an intranet, the Internet, or any other distributed processing and storage network.

The marking system 200 includes a controller 210, a memory 220, a marking device 230, an input/output interface 240, a tone reproduction curve (TRC) obtaining device 250, and a reflectance value obtaining device 260, which are interconnected by a data/control bus 290. The TRC obtaining device 250 includes a gray balanced TRC obtaining device 252 and a spatial gray balanced TRC obtaining device 254. The reflectance value obtaining device 260 includes a reflectance sensor 262 and a fiducial mark sensor 264.

The controller 210 controls the operation of other components of the marking system 200 as necessary, performs any necessary calculations and executes any necessary programs for implementing the processes of the marking system 200 and its individual components, and controls the flow of data between other components of the marking system 200 as needed.

The memory 220 may serve as a buffer for information coming into or going out of the marking system 200, may store any necessary programs and/or data for implementing the functions of the marking system 200, and/or may store data at various stages of processing. Furthermore, it should be appreciated that the memory 220, while depicted as a single entity, may actually be distributed. Alterable portions of the memory 220 are, in various exemplary embodiments, implemented using static or dynamic RAM. However, the memory 220 can also be implemented using a floppy disk and disk drive, a writeable optical disk and disk drive, a hard drive, flash memory or the like. The generally static portions of the memory 220 are, in various exemplary embodiments, implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like.

The marking device 230 may be, for example, a marking engine or marking head, such as a print engine or print head, and is capable of reproducing images or text received from the data source 300 via the input/output interface 240 by causing marking medium, such as ink, toner or the like, to be arranged in appropriate configurations on a substrate.

The TRC obtaining device 250 obtains gray balanced TRCs and spatial gray balanced TRCs in accordance with reflectance values obtained from test patches, as described in more detail below.

The reflectance value obtaining device 260 obtains reflectance values from test patches, such as the test patches 110, 120, 140 and 150 shown in FIG. 2. Specifically, relative movement is effected between the test patches and the reflectance sensor 262, which may, for example, be an on-line or off-line spectrophotometer, so that the reflectance sensor 262 can obtain a reflectance value from each patch. An on-line spectrophotometer may be a special purpose spectrophotometer built into the marking device, or may be implemented using an LED array as described, for example, in co-pending U.S. patent application Ser. No. 09/941,774, entitled SYSTEMS AND METHODS FOR DETERMINING SPECTRA USING DYNAMIC KARHUNEN-LOEVE ALGORITHMS WITH MEASUREMENTS FROM LED COLOR SENSOR, or co-pending U.S. patent application Ser. No. 09/941,858, entitled SYSTEMS AND METHODS FOR DETERMINING SPECTRA USING DYNAMIC LEAST SQUARES ALGORITHMS WITH MEASUREMENTS FROM LED COLOR SENSOR. In the case of an off-line spectrophotometer, which may, for example, be one of various spectrophotometers sold by Gretag MacBeth, ExColor, and X-Rite, it will be appreciated that the reflectance value obtaining device 260 will not be physically integrated into the marking device 200 as shown in FIG. 3, but rather will be arranged separately with a separate connection or other device for transferring reflectance measurements to the controller 210, TRC obtaining device 250 and/or memory 230.

The fiducial marks 130 are detected by the fiducial mark sensor 264 to trigger measuring of the reflectance of adjacent patch 110, 120, 140 or 150 by the reflectance sensor 262.

Depending on the physical arrangement of the reflectance sensor 262 and/or the fiducial mark sensor 264, the test pattern 100 may need to be rotated 90 degrees manually or automatically in order to have the patches 110, 120, 140 or 150 scanned. For example, if the reflectance sensor 262 is mounted so as to be stationary relative to the overall marking system 200 and the patches are detected by moving the test pattern past the reflectance sensor 262 in the slow scan direction, then the patches 140 and 150 can not be detected unless the test pattern is rotated 90 degrees from its orientation during marking of the test pattern. However, with some arrangements, particularly with off-line spectrophotometer arrangements, the reflectance sensor 262 and test pattern 100 may be relatively movable in two crossing directions, thereby making it unnecessary to rotate the test pattern 100.

Spatial gray balanced TRCs are obtained in two general steps: (1) the gray balanced TRC obtaining device 252 obtains gray balanced TRCs based on the reflectance values of the test patches 110 and 120, and (2) the spatial gray balanced TRC obtaining device 254 scales the gray balanced TRCs based on reflectance values of the test patches 140 and 150 to obtain spatial gray balanced TRCs. These spatial gray balanced TRCs may then be used to calibrate the marking device 200.

The steps performed by the gray balanced TRC obtaining device 252 and the spatial gray balanced TRC obtaining device 254 are not necessarily sequential. Portions of the steps may be performed concurrently, and/or the steps may interact such that one or more portions of one step use information obtained from one or more portions of the other step.

In some embodiments, the spatial gray balanced TRCs are obtained as follows. First, the test pattern 100 is marked on a substrate by the marking system 200 after being run through a TRC in the image path to determine the appropriate CMY or K values for the next iteration. The reflectance spectra of each patch 110, 120, 140 and 150 is measured using the reflectance sensor 262. The reflectance spectra are converted to a color space such as L*a*b*. These calculated L*a*b* values are compared to desired L*a*b* values, which have been empirically determined in advance according to known or later developed methods. If the differences are higher than a predetermined threshold, an iterative process, which may include marking of a revised test pattern on a substrate, obtaining measured values of test patches of the revised test pattern, and comparing the new measured values with the desired values, is performed to converge the calculated L*a*b* values toward the desired L*a*b*values. Details of one such iterative process are disclosed in, for example, above-mentioned U.S. patent application Ser. No. 09/566,291. The iterative process is repeated as necessary until the calculated L*a*b* values have been converged to within the predetermined threshold.

A gain matrix designed using (1) the reflectance measurements for all of the patches 110, 120, 140 and 150 at their input digital values and (2) known single and/or multivariate feedback control principles may be used for the iterative process with respect to all of the patches 110, 120, 140 and 150.

After the iterative process has been completed, TRCs are generated based on the resulting calculated CMY and K values obtained for the test patches 110 and 120, respectively. These are the gray balanced TRCs, and are one-dimensional TRCs.

The K values obtained for the patches 140 and the CMY values obtained for the patches 150, which may have been revised, along with the CMY and K values for the patches 110 and 120 during the above-described iterative process, are used to create non-uniformity profile functions, which are in turn used, in combination with the one-dimensional, gray balanced TRCs obtained from the patches 110 and 120, to generate spatial gray balanced TRCs. An example is shown in FIG. 4.

Figure 4:
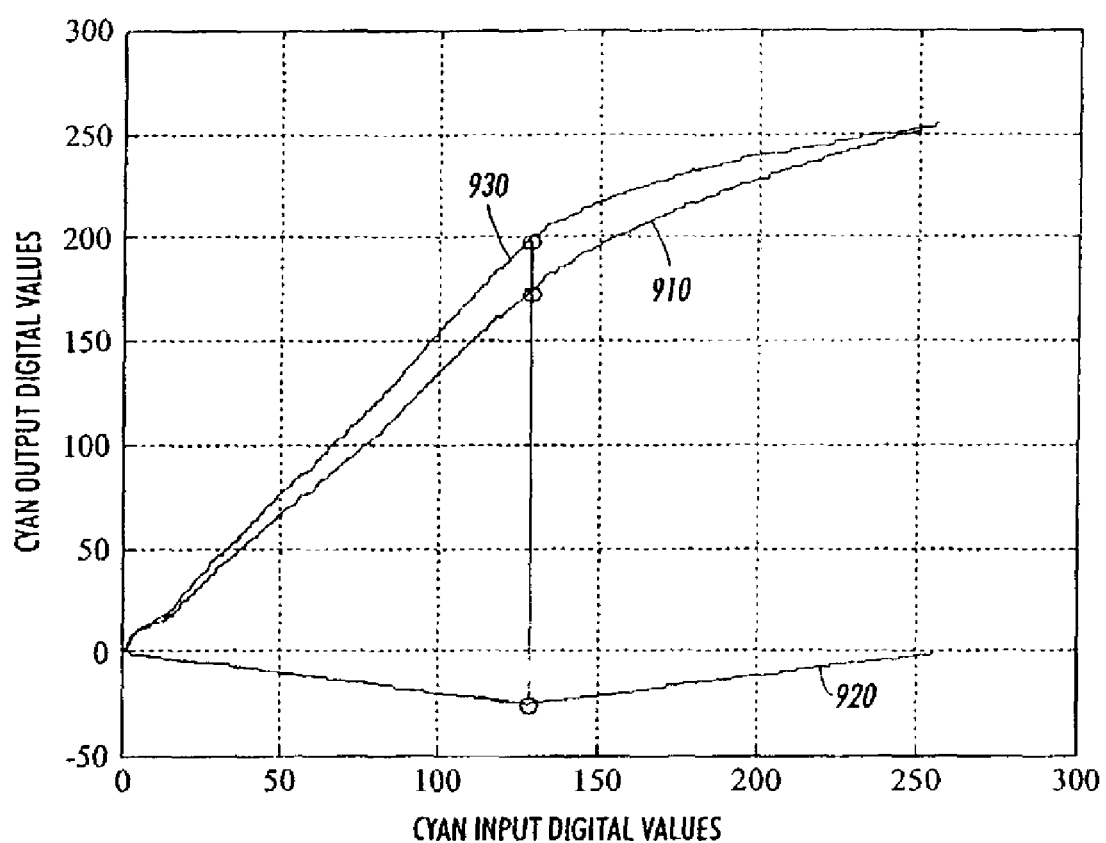
FIG. 4 is a diagram showing an exemplary gray balanced TRC, spatial gray balanced TRC and non-uniformity profile function obtained according to this invention.

FIG. 4 is a diagram showing an exemplary cyan TRC 910 obtained using CMY patches 110. A non-uniformity profile function 920 obtained using the patches 150, as described in more detail below, is operated with the TRC 910 to obtain a spatial gray balanced TRC 930.

A simple equation for the non-uniformity profile function can be of a linear nature as shown below:

Nf=[(Dspatial_iter−Dgray_iter)×Dinput]/Dspatial_input; for Dinput=0 to Dspatial_input+1 and

Nf=[(Dspatial_iter−Dgray_iter)×(255−Dinput)]/[255−Dspatial_input+1]; for Dinput=Dspatial_input+2 to 255.

Where,

Nf is the non-uniformity at the test patch location;

Dspatial_iter are the converged digital CMY or K values of the spatial patches (patches 140 and 150);

Dgray_iter are the converged CMY or K values of the gray balance patches (patches 110 and 120);

Dinput are the digital input values from 0 to 255 in steps of 1 for an 8-bit system; and Dspatial_input are the CMYK input values of the spatial patches (patches 140 and 150).

It should be appreciated that the spatial non-uniformity function can also be non-linear and its shape can be predetermined through offline experiments. The input values for the spatial patches are selected at the region where the slope of this function is zero—which is the highest sensitivity point. Once the non-uniformity function at the spatial patch location is obtained from the above equation using the converged CMY or K values of the spatial patches, the spatial TRCs are calculated using the following equation:

Spatial gray balanced TRC at the spatial patch location=gray balanced TRC+non-uniformity profile function at the spatial patch location After spatial gray balanced TRCs are obtained for each of the patch locations for the patches 140 and 150, it is possible to increase the density of the spatial gray balanced TRCs along the fast-scan direction by well known interpolation and smoothing techniques. Ultimately, one spatial gray balanced TRC may be generated for every pixel of a page, e.g., a substrate to be marked by the marking system 200.

In the above-described procedure, it is assumed that, during the iterative process, CYM and K values are iteratively revised and a revised test pattern is created and marked on a test substrate during each iteration. In this case, the TRC in the image path, which is a spatial TRC and may be an identity TRC or any other predetermined TRC, remains unchanged until it is replaced by the spatial gray balanced TRC obtained as a result of the processing. As a modification of the above-described procedure, rather than modifying the test pattern file itself, the spatial TRC may be updated during each iteration. In this case, the updated spatial TRC that remains after the iterative process has been completed is the final TRC that is stored and retained.

Using the above-described procedure, spatial gray balanced TRCs can be automatically generated in a very efficient manner. Therefore, it becomes feasible to calibrate the marking device 200 frequently, thus correcting non-uniformity defects and maintaining color accuracy and spatial stability of images over time, and down time for calibration is reduced.

Furthermore, using this system and method, a page-width scanner is not necessary for determining spatial TRCs. This allows further reduction in cost.

It should be understood that each of the circuits shown in FIG. 3 can be implemented as portions of a suitably programmed general purpose computer. Alternatively, each of the circuits shown in FIG. 3 can be implemented as physically distinct hardware circuits within an ASIC, or using a FPGA, a PDL, a PLA or a PAL, or using discrete logic elements or discrete circuit elements. The particular form each of the circuits shown in FIG. 3 will take is a design choice and will be obvious and predictable to those skilled in the art.

Figure 5:
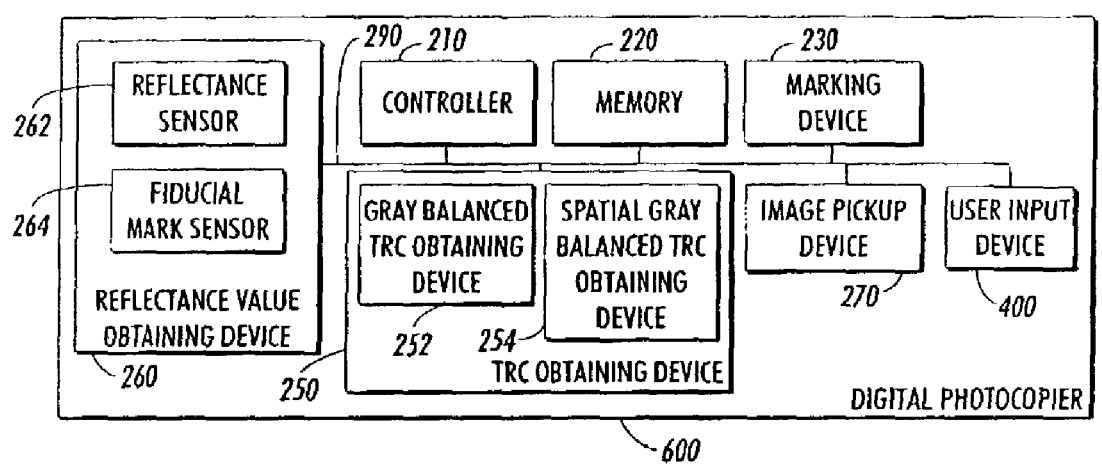
FIG. 5 is a functional block diagram illustrating an exemplary embodiment of a digital photocopier according to this invention.

FIG. 5 is a functional block diagram illustrating an exemplary embodiment of a digital photocopier 600 according to this invention. The digital photocopier 600 is similar to the marking system 200 shown in FIG. 3, except that the digital photocopier 600 may be self-contained because it includes an image pickup device 270, such as a scanner, and a user input device 400, and therefore is not reliant on an external data source (although an external data source may also be connected, if desired).

Figure 6:
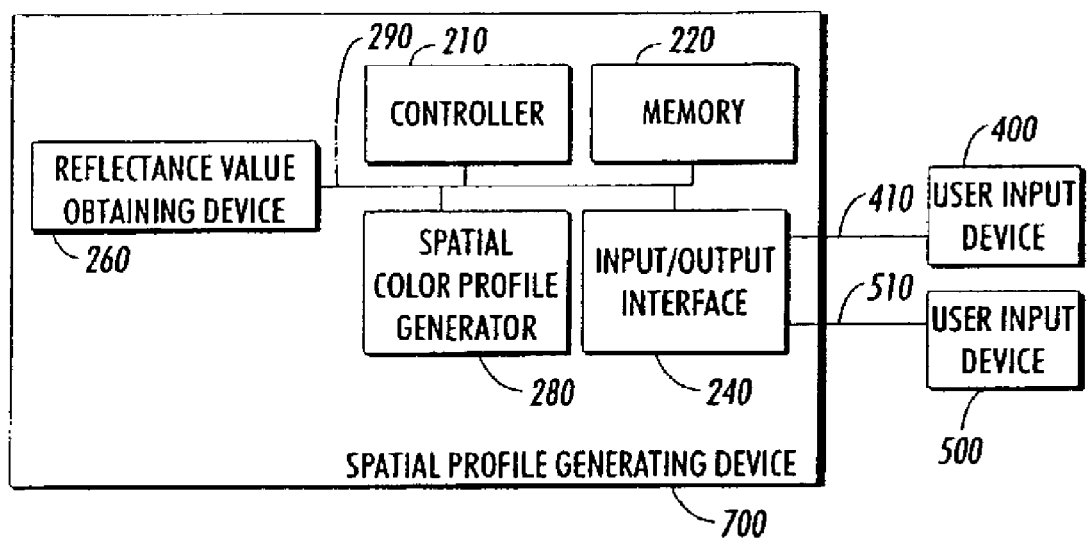
FIG. 6 is a functional block diagram illustrating an exemplary embodiment of a spatial profile generating device according to this invention.

FIG. 6 is a functional block diagram illustrating an exemplary embodiment of a spatial profile generating device 700 according to this invention. Spatial tone reproduction curves can be considered as spatial profiles of a test pattern. However, the spatial profile generating device 700 is not limited to application to a marking engine, and may be used to generate a spatial color profile of any surface. The spatial profile generating device 700 includes a reflectance value obtaining device 260 and a spatial color profile generator 280, and is connected to a data sink 500 and a user input device 400 via links 510 and 410, respectively.

The links 510 and 410, like the link 310 of FIG. 3, may be any suitable wired, wireless or optical links. The data sink 500 can be any device that is capable of outputting or storing processed data generated by the spatial profile generating device 700, such as a printer, a copier or other image forming devices, a facsimile device, a display device, a memory, or the like.

Figure 7:
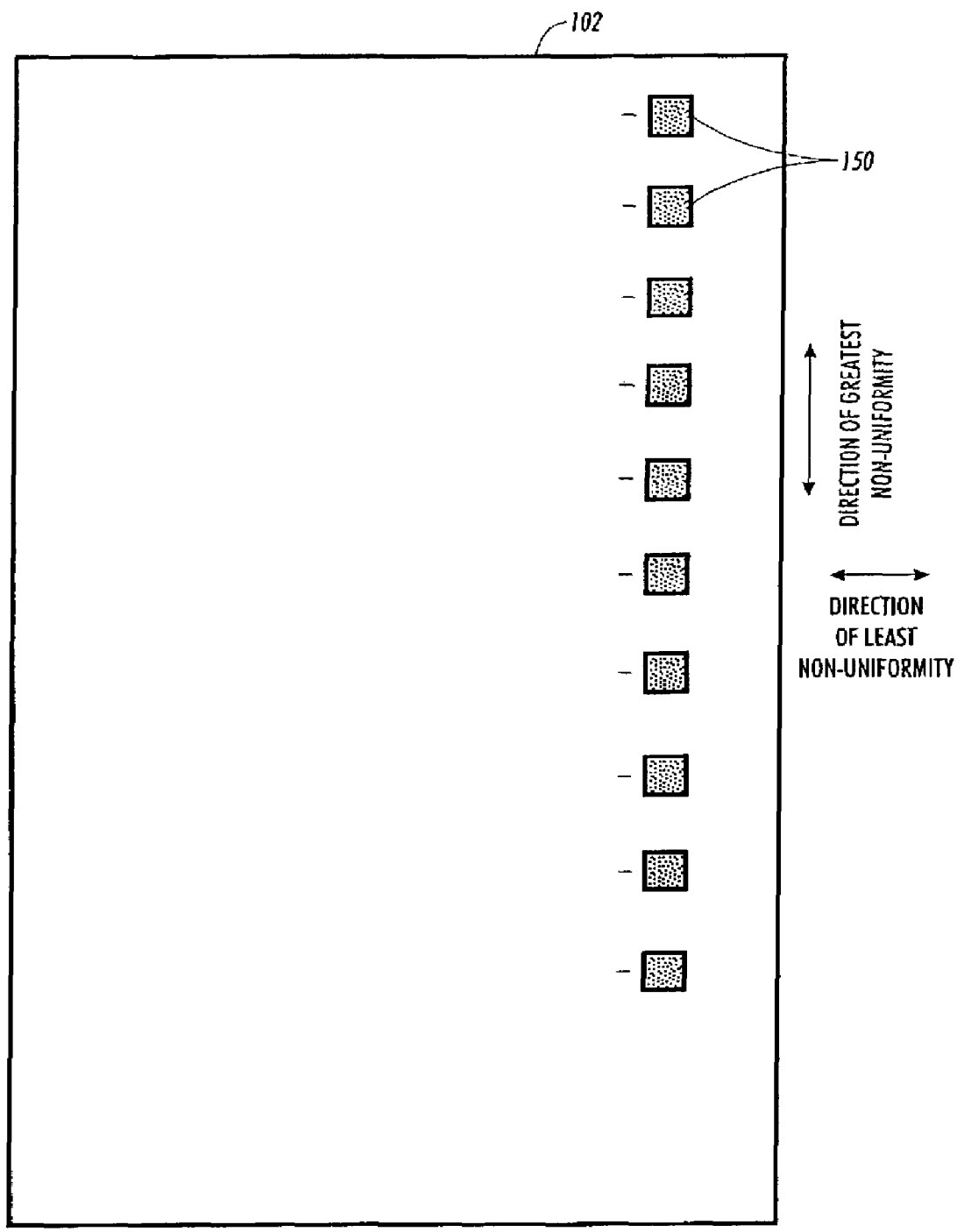
FIG. 7 illustrates an exemplary test patch pattern used for obtaining a spatial color profile according to this invention.

FIG. 7 illustrates an exemplary test patch pattern 102 used for obtaining a spatial color profile using the spatial profile generating device 700 of FIG. 6. Assuming there is spatial non-uniformity across the surface to be profiled, relative movement between the reflectance value obtaining device should be effected in the direction of greatest non-uniformity. Patches 150 represent actual color patches of an actual surface. It should be appreciated that the patches may not actually be visibly separate patches, but may instead merely represent individual positions on a continuously colored surface. Examples of uses for the spatial profile generating device 700, other than for calibrating a marking system, might include coil coating applications, painting, etc.

Figure 8:
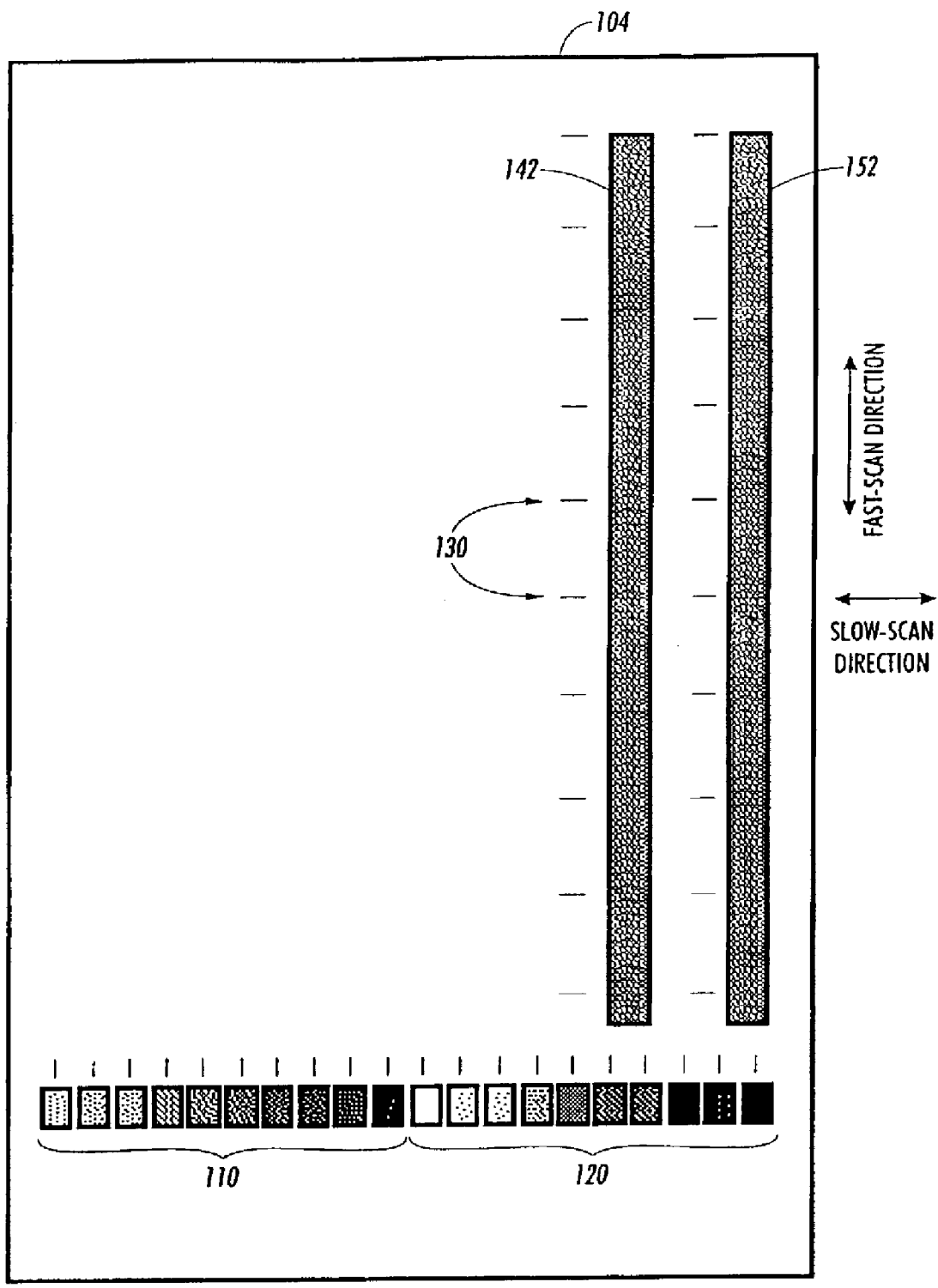
FIG. 8 illustrates an exemplary test patch pattern used for calibrating a marking system according to this invention.

FIG. 8 illustrates another exemplary test patch pattern 104 used for calibrating the marking system 200. From this example, it can be seen that single elongated patches 142 and 152 may be used in place of the plurality of patches 140 and the plurality of patches 150. In this case, a plurality of reflectance measurements are taken along each patch 142 and 152, triggered by the fiducial marks 130. It should be appreciated that the fiducial marks 130 are not necessary if some other method of triggering the reflectance sensor 262 is used.

It should also be appreciated that the patches 110 and 120 need not be near the middle of the page, as shown in FIG. 2, or near the bottom of the page, as shown in FIG. 8, but may be at any other location on the page as desired or convenient. Those skilled in the art will also appreciate various other possible modifications of the test pattern. For example, rather than providing patches 140 and 150 or 142 and 152 as shown in FIGS. 2 and 8, a plurality of sets of the patches 110 and 120 may be provided. For example, considering the patches 110 and 120 of FIG. 2 as a single "row,"

a plurality of such "rows" could be printed, such that patches of each "row" would align with corresponding patches of the other "rows." Corresponding patches of the rows would thus form "columns" extending in the fast-scan direction. Selected ones of these "columns" could then be used in the same manner as the patches 140 and 150 or 142 and 152 of FIGS. 2 and 8.

Other conceivable variations on the test patterns of FIGS. 2 and 8 are that the CMY patches and K patches could be mixed, and/or that the number of K patches could differ from the number of CMY patches. For example, the patches 110 shown in FIG. 2 could be replaced by seven K patches varying from 0-100% coverage and three CMY patches at 100% coverage, and the patches 120 could be replaced by CMY patches that vary from 0 to a number slightly less than 100% coverage.

Figure 9:
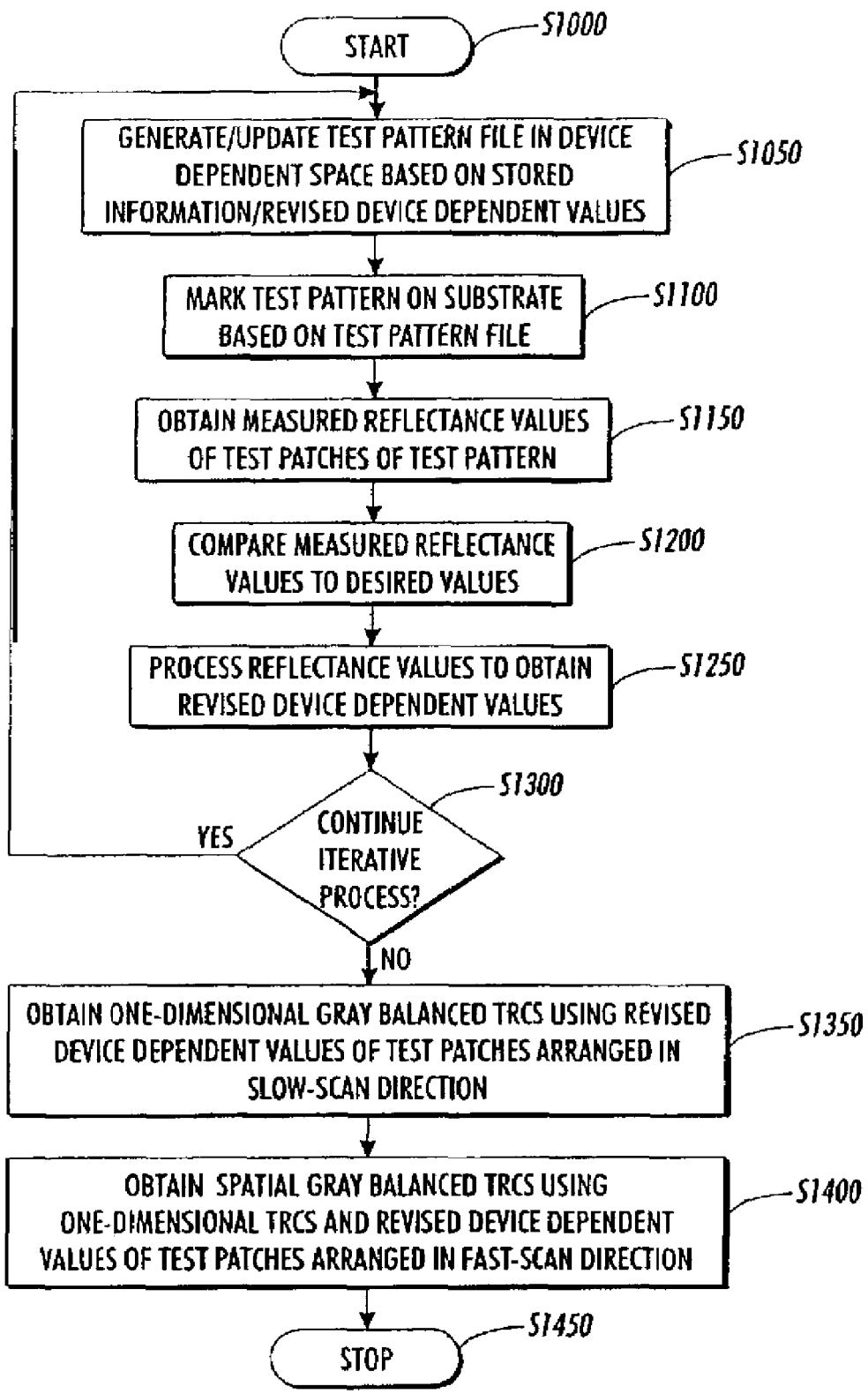
FIG. 9 is a flowchart illustrating a first exemplary method of obtaining spatial gray balanced tone reproduction curves according to this invention.

FIG. 9 is a flowchart illustrating a first exemplary method of obtaining spatial gray balanced tone reproduction curves according to this invention. Beginning in step S1000, the process continues to step S1050 and generates a test pattern file in device dependent space, such as CMYK space. This is done based on pre-stored and/or user-input information. The test pattern is marked on a substrate in step S1100. The process then continues to step S1150

In step S1150, measured reflectance values of test patches of the test pattern are obtained using, for example, a spectrophotometer or the like. Continuing to step S1200 the measured reflectance values are compared to desired values, and in step S1250, the measured reflectance values are processed to obtain revised device dependent values, e.g., revised CYMK values. The process then continues to step S1300 and determines whether to continue an iterative process. This determination may be made based on, for example, whether the difference between the measured values and desired values compared in step S1200 is within a predetermined threshold. If it is determined to continue the iterative process, the process returns to step S1050 and updates the test pattern file, and steps S1050-S1300 are repeated. Otherwise, the process continues to step S1350.

In step S1350, one-dimensional gray balanced TRCs are obtained using the measured reflectance values, from the most recent iteration of step S1150, of test patches in the test pattern that are arranged in a slow-scan direction. The process continues to step S1400 and obtains spatial gray balanced TRCs by using the one-dimensional gray balanced TRCs and the measured reflectance values, from the most recent iteration of step S1150, of test patches in the test pattern that are arranged in a fast-scan direction. These spatial gray balanced TRCs are saved to be used, for example, for calibrating a marking system, and the process stops at step S1450.

Figure 10:
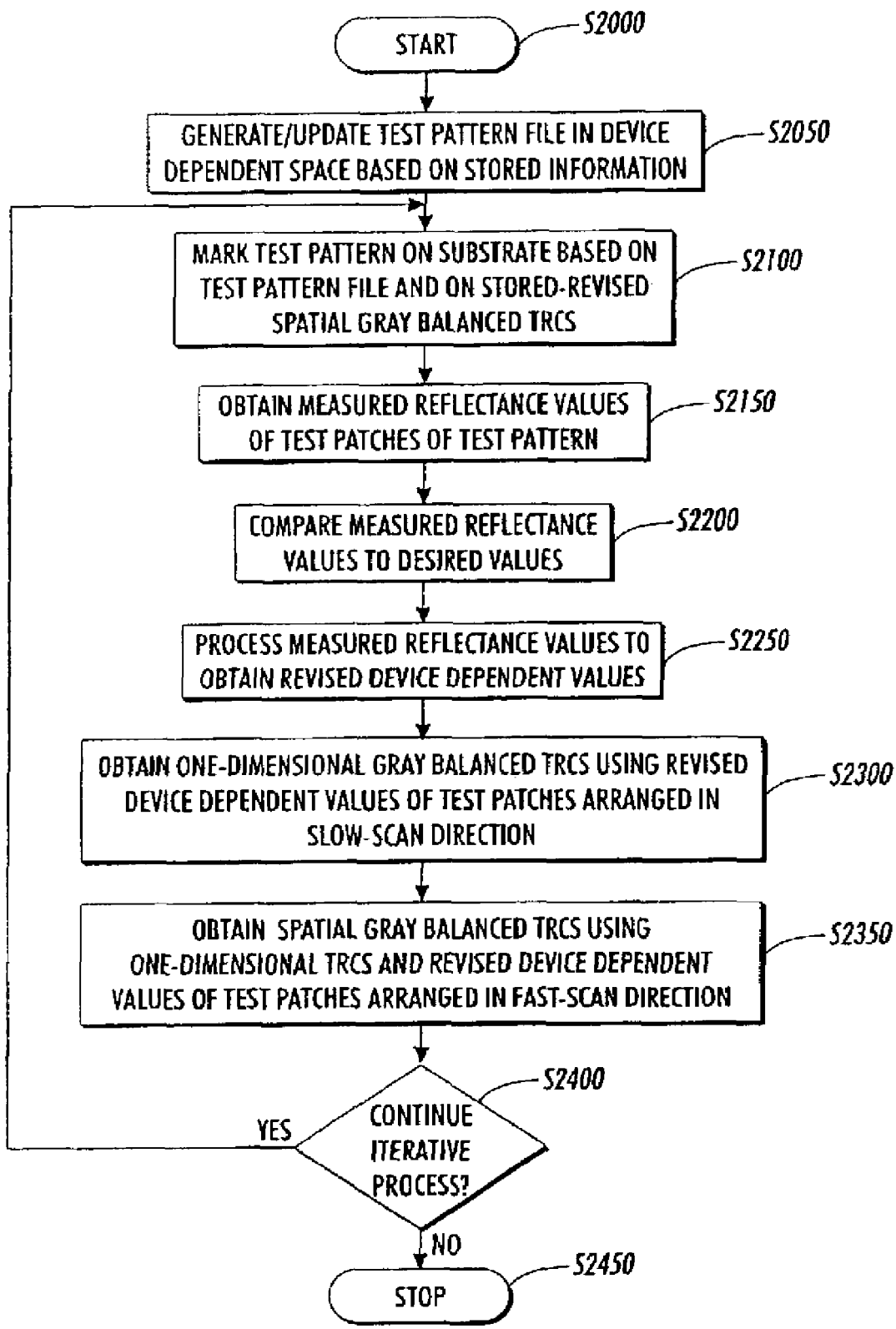
FIG. 10 is a flowchart illustrating a second exemplary method of obtaining spatial gray balanced tone reproduction curves according to this invention.

FIG. 10 is a flowchart illustrating a second exemplary method of obtaining a spatial color profile according to this invention. Beginning in step S2000, the process continues to step S2050 and generates a test pattern file in device dependent space, such as CMYK space. This is done based on pre-stored and/or user-input information. The test pattern is marked on a substrate in step S2100, based on the test pattern file and on a stored spatial gray balance TRC. The process then continues to step S2150.

In step S2150, measured reflectance values of test patches of the test pattern are obtained using, for example, a spectrophotometer or the like. Continuing to step S2200, the measured reflectance values are compared to desired values, and in step S2250, the measured reflectance values are processed to obtain revised device dependent values, e.g., revised CYMK values.

Next, in step S2300, one-dimensional gray balanced TRCs are obtained using the measured reflectance values, from the most recent iteration of step S2150, of test patches in the test pattern that are arranged in a slow-scan direction. The process continues to step S2350 and obtains spatial gray balanced TRCs by using the one-dimensional gray balanced TRCs and the measured reflectance values, from the most recent iteration of step S2150, of test patches in the test pattern that are arranged in a fast-scan direction. The process then continues to step S2400 and determines whether to continue an iterative process. This determination may be made based on, for example, whether the difference between the measured reflectance values and desired values compared in step S2200 is within a predetermined threshold. If it is determined to continue the iterative process, the process returns to step S2100 and revises the spatial gray balanced TRC, a new test pattern is marked based on the revised spatial gray balanced TRC the test pattern file, and steps S2100-S2350 are repeated. Otherwise, the process retains the most recent spatial gray balanced TRC for, for example, subsequent calibration of a marking system, and continues to step S2450 and stops.

Figure 11:
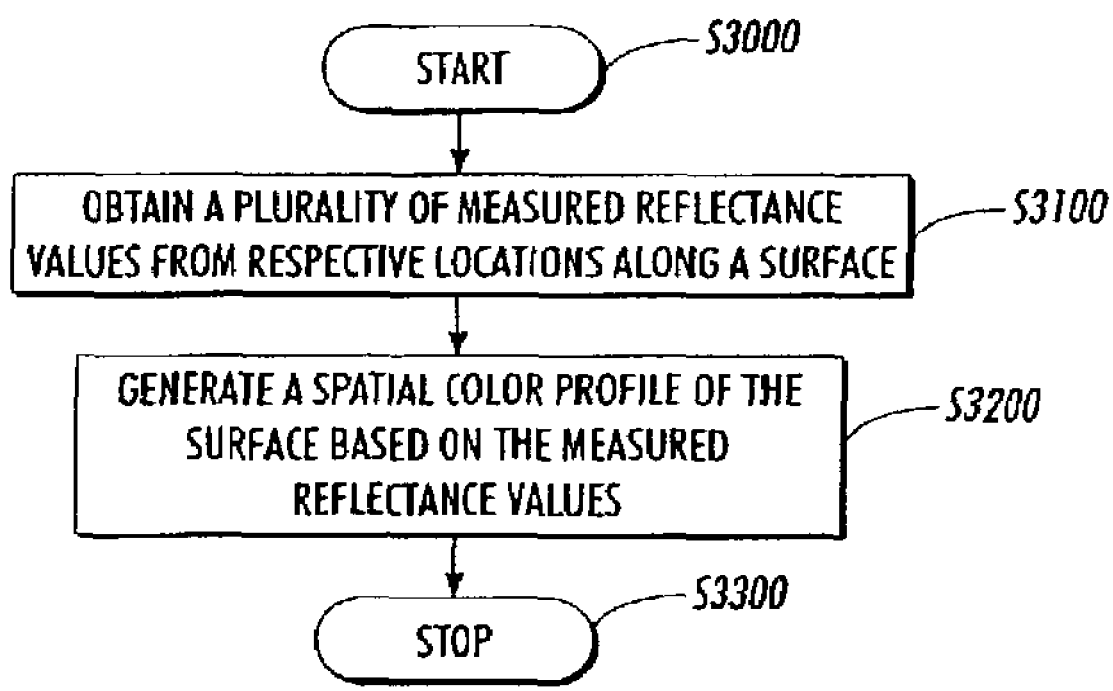
FIG. 11 is a flowchart illustrating an exemplary method of obtaining a spatial color profile according to this invention.

FIG. 11 is a flowchart illustrating an exemplary method of obtaining a spatial color profile according to this invention. Beginning in step S3000, the process continues to step S3100 and obtains a plurality of measured reflectance values from respective locations spaced along a surface, preferably in a direction of known or suspected non-uniformity. Next, in step S3200, a spatial color profile of the surface is generated based on the measured reflectance values. The process then continues to step S3300 and stops.

The marking system 200 of FIG. 3 and the spatial profile generating device 700 of FIG. 6 may be implemented on a single program general purpose computer or separate programmed general purpose computer, with an associated reflectance value obtaining device 260 (and marking device 230, in the case of FIG. 3). The marking system 200 and spatial profile generating device 700 can also be implemented on a special purpose computer, a programmed micro-processor or micro-controller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a finite state machine that is in turn capable of implementing the flowcharts shown in FIGS. 9-11, or appropriate portions thereof, can be used to implement the marking system and/or spatial profile generating device according to this invention.

Furthermore, the disclosed methods may be readily implemented in software using object or object-oriented software development environments that provide portable source code that can be used on a variety of computer or workstation hardware platforms. Alternatively, appropriate portions of the disclosed marking system 200 and the spatial profile generating device 700 may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The processing systems methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of this invention can be implemented as a routine embedded on a personal computer or as a resource residing on a server or workstation, such as a routine embedded in a photocopier, a color photocopier, a printer driver, a scanner, or the like. The systems and methods can also be implemented by physical incorporation into a software and/or hardware system, such as the hardware and software system of a photocopier or a dedicated image processing system.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

What is claimed is:

1. A method of obtaining tone reproduction curves for calibrating a marking system, comprising:
   obtaining a plurality of reflectance values from a plurality of test patches of marking medium marked by the marking system; and
   obtaining a set of spatial gray balanced tone reproduction curves based on the reflectance values of the test patches;
   where in the obtaining the plurality of reflectance values comprises:
   obtaining a plurality of reflectance values from a plurality of first ones of the test patches, the first ones of the test patches being aligned in a first direction; and
   obtaining a plurality of reflectance values from one or more second ones of the test patches, the one or more second ones of the test patches being aligned in a second direction that crosses the first direction.

2. The method of claim 1, wherein the first direction is a direction of least non-uniformity of the marking system, and the second direction is a direction of greatest non-uniformity of the marking system.

3. The method of claim 1, wherein the one or more second ones of the test patches comprises at least one patch of CMY gray extending in the second direction.

4. The method of claim 3, wherein the one or more second ones of the test patches further comprises at least one patch of K gray extending parallel to the at least one patch of CMY gray.

5. The method of claim 1, wherein the one or more second ones of the test patches extend substantially an entire length of a marking path of the marking system.

6. The method of claim 1, further comprising obtaining a set of gray balanced tone reproduction curves based on the reflectance values of the first ones of the test patches, wherein the obtaining the set of spatial gray balanced tone reproduction curves is performed based on the reflectance values of the one or more second ones of the test patches and on the set of gray balanced tone reproduction curves.

7. The method of claim 6, wherein the obtaining the set of spatial gray balanced tone reproduction curves comprises operating a non-uniformity profile function with the gray balanced tone reproduction curves.

8. The method of claim 7, wherein the non-uniformity function is obtained based on the reflectance values of the one or more second ones of the test patches.

9. The method of claim 1, wherein obtaining the set of spatial gray balanced tone reproduction curves comprises obtaining a spatial gray balanced tone reproduction curve for each pixel of a page.

10. The method of claim 1, wherein the obtaining the plurality of reflectance values is performed a plurality of times in an iterative process to converge the reflectance values toward desired values, each iteration of the iterative process being performed using a successive revised test pattern including a revised version of the plurality of test patches.

11. The method of claim 10, wherein each successive revised test pattern is marked based on a test pattern file that has been updated based on information obtained by comparing the reflectance values with the desired values.

12. The method of claim 10, wherein each successive revised test pattern is marked based on a revised spatial gray balanced tone reproduction curve that has been revised based on information obtained by comparing the reflectance values with the desired values.

13. A storage medium on which is recorded a program for implementing the method of claim 1.

14. A system that obtains tone reproduction curves for calibrating a marking system, comprising:
    a reflectance value obtaining device that obtains a plurality of reflectance values from a plurality of test patches of marking medium marked by the marking system; and
    a tone reproduction curve obtaining device that obtains a set of spatial gray balanced tone reproduction curves based on the reflectance values of the test patches;
    wherein the obtaining the plurality of reflectance values comprises:
    obtaining a plurality of reflectance values from a plurality of first ones of the test patches, the first ones of the test patches being aligned in a first direction; and
    obtaining a plurality of reflectance values from one or more second ones of the test patches, the one or more second ones of the test patches being aligned in a second direction that crosses the first direction.

15. The system of claim 14, wherein the first direction is a direction of least non-uniformity of the marking system, and the second direction is a direction of greatest non-uniformity of the marking system.

16. The system of claim 14, wherein the one or more second ones of the test patches comprises at least one patch of CMY gray extending in the second direction.

17. The system of claim 16, wherein the one or more second ones of the test patches further comprises at least one patch of K gray extending parallel to the at least one patch of CMY gray.

18. The system of claim 14, wherein the one or more second ones of the test patches extend substantially an entire length of a marking path of the marking system.

19. The system of claim 14, further comprising obtaining a set of gray balanced tone reproduction curves based on the reflectance values of the first ones of the test patches, wherein the obtaining the set of spatial gray balanced tone reproduction curves is performed based on the reflectance values of the one or more second ones of the test patches and on the set of gray balanced tone reproduction curves.

20. The system of claim 19, wherein the obtaining the set of spatial gray balanced tone reproduction curves comprises operating a non-uniformity profile function with the gray balanced tone reproduction curves.

21. The system of claim 20, wherein the non-uniformity function is obtained based on the reflectance values of the one or more second ones of the test patches.

22. The system of claim 14, wherein obtaining the set of spatial gray balanced tone reproduction curves comprises obtaining a spatial gray balanced tone reproduction curve for each pixel of a page.

23. The system of claim 14, wherein the obtaining the plurality of reflectance values is performed a plurality of times in an iterative process to converge the reflectance values toward desired values, each iteration of the iterative process being performed using a successive revised test pattern including a revised vershn of the plurality of test patches.

24. The system of claim 23, wherein each successive revised test pattern is marked based on a test pattern file that has been updated based on information obtained by comparing the reflectance values with the desired values.

25. The system of claim 23, wherein each successive revised test pattern is marked based on a revised spatial gray balanced tone reproduction curve that has been revised based on information obtained by comparing the reflectance values with the desired values.

26. A marking system incorporating a system that obtains tone reproduction curves according to claim 14.

27. The marking system of claim 26, wherein the marking system is one of a digital photocopier and a color printer.

28. The marking system of claim 26, wherein the marking system is a xerographic color printer.

29. The marking system of claim 26, wherein the marking system is an ink-jet printer.

* * * * *